United States Patent Office 3,504,929
Patented Apr. 7, 1970

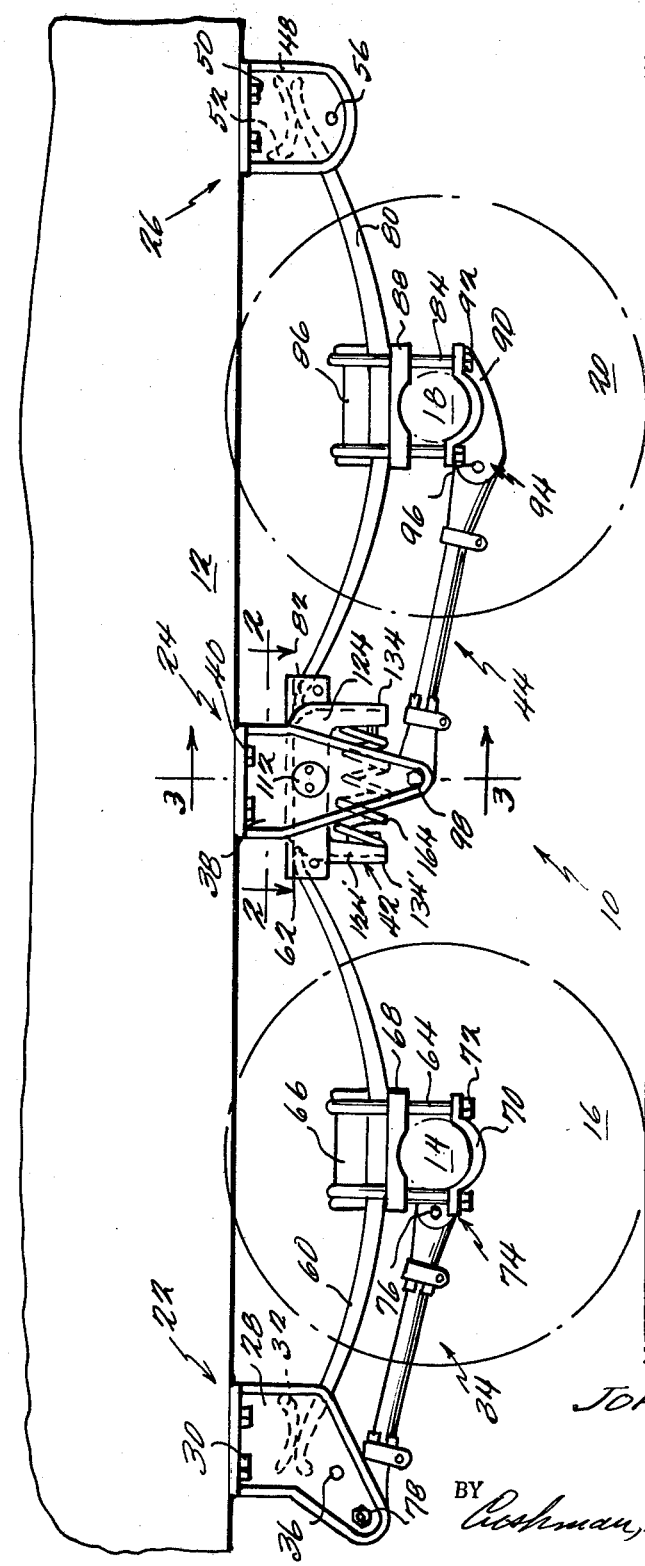

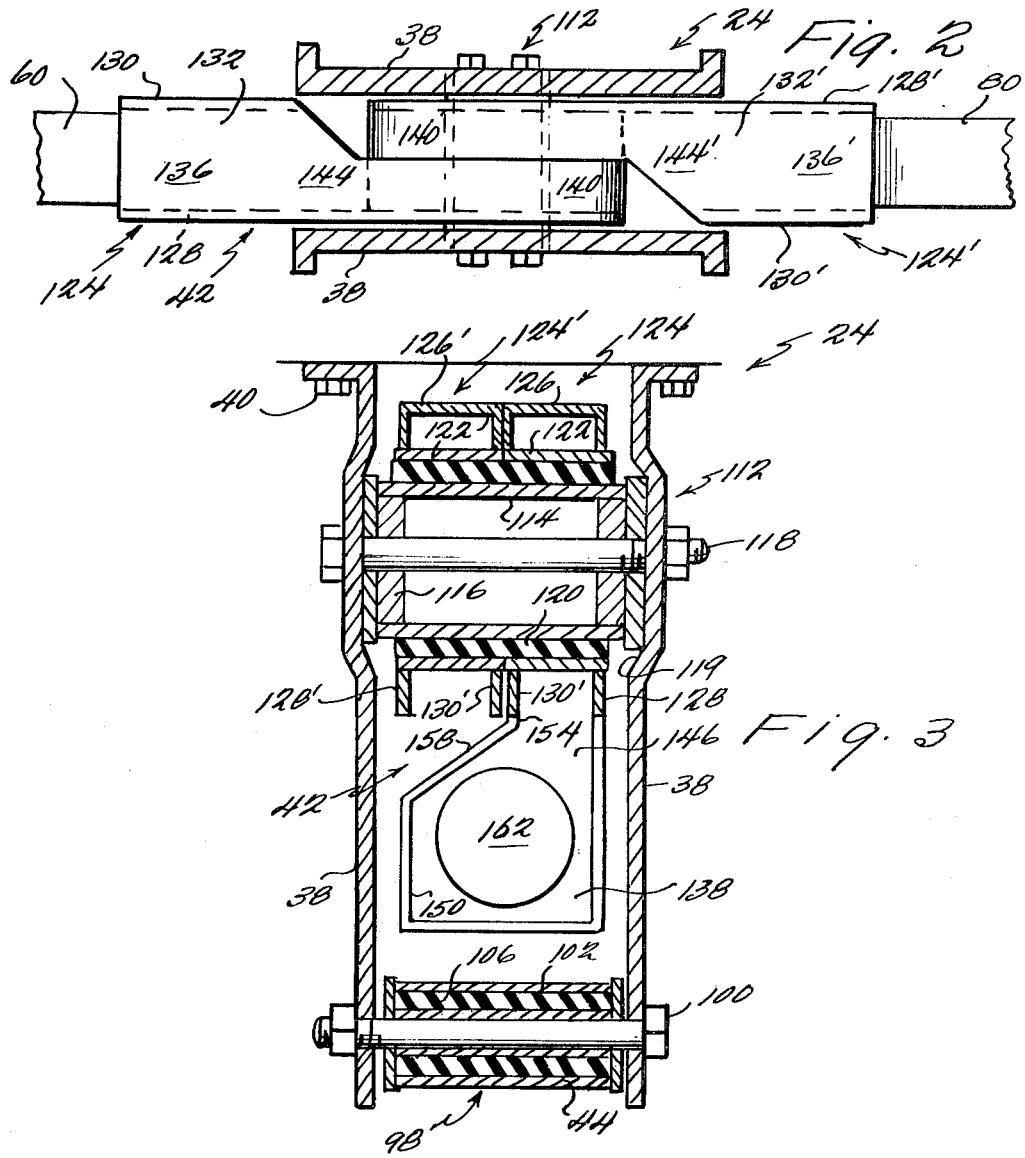
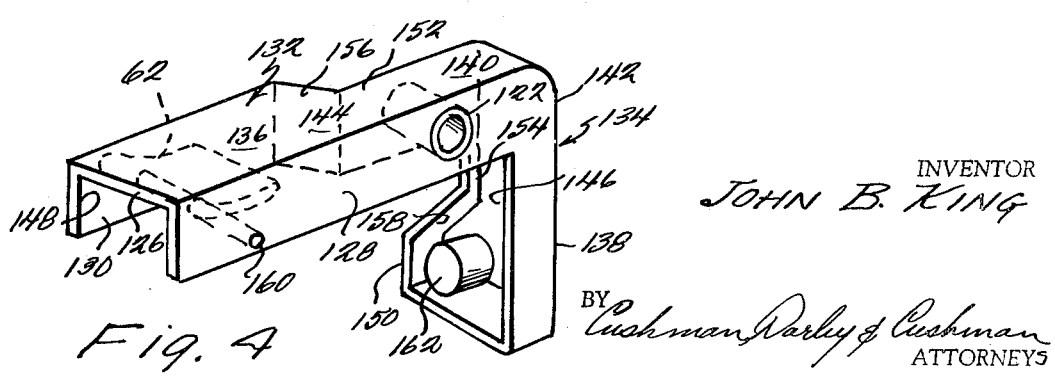

3,504,929
TWO-PIECE EQUALIZER BRACKET
John B. King, Springfield, Mo., assignor to Hutchens and Son Metal Products, Inc., Springfield, Mo., a corporation of Missouri
Filed Mar. 4, 1968, Ser. No. 710,024
Int. Cl. B60g 19/02
U.S. Cl. 280—104.5                  8 Claims

ABSTRACT OF THE DISCLOSURE

The equalizer bracket comprises first and second elements pivotally mounted on a bearing member and having portions adapted to engage the adjacent ends of suspension assemblies associated with tandem axles. Each element has a depending portion there being a dampening means such as a spring interposed between the depending portions to transfer forces from one element to the other element and to dampen relative movement of the elements.

BRIEF DESCRIPTION OF THE INVENTION

This invention relates to an equalizer bracket for a tandem axle suspension assembly and, more specifically, to an equalizer bracket for improving the ride imparted to the vehicle by tandem axle suspension assemblies.

It is an object of the present invention to provide a simple, inexpensive equalizer bracket for tandem axle vehicles that not only automatically shifts the load between the axles of a vehicle in accordance with the requirements of different situations, but also improves the ride imparted to the vehicle by means of the suspension system.

The invention is carried out by disposing a two-piece equalizer bracket intermediate the suspension assemblies associated with the axles of a tandem axle assembly with the equalizer brackets engaging the adjacent ends of the suspension assemblies associated with the respective axles. The two elements of the bracket are pivotally mounted on a bearing which is mounted on the frame of the vehicle in such a way that the elements can pivot relative to each other. Each element has a depending portion and dampening means, such as a coil spring, is interposed between the depending portions to transfer forces from one element to the other and, consequently, from the suspension assembly of one axle to the suspension assembly of the other axle. The dampening means also dampens relative movement of the elements, with respect to each other, when the elements are pivoted about the bearing by the suspension assemblies of the two axles so that the ride imparted to the vehicle by the suspension assembly is cushioned and thereby improved.

The features and advantages of the present invention discussed above will become more apparent and, in addition, other features and advantages of the invention will become apparent from the following detailed description when taken in conjunction with the drawings in which:

FIGURE 1 is a side elevational view of the frame of a vehicle taken through tandem axles of the vehicle and illustrating the equalizer assembly of the present invention;

FIGURE 2 is a plan view of the equalizer assembly of the present invention taken substantially along line 2—2 of FIGURE 1;

FIGURE 3 is a sectional view of the equalizer assembly taken substantially along lines 3—3 of FIGURE 1 and illustrating the manner in which the two elements of the bracket are pivotally mounted on the frame; and FIGURE 4 is a perspective view of one of the elements of the equalizer bracket prior to the assembly of the bracket.

DETAILED DESCRIPTION OF THE INVENTION

Referring now to the drawings, there is shown in FIGURE 1 thereof, a tandem axle suspension assembly generally indicated at 10 embodying the principles of the present invention. The suspension assembly is shown mounted on a vehicle frame 12 forming a part of a conventional truck body of any suitable construction.

The suspension assembly 10, as shown, is of the tandem axle type providing a front axle 14 of conventional construction having front wheels 16 rotatably mounted on the ends thereof and a rear axle 18 of conventional construction having rear wheels 20 rotatably mounted on the ends thereof. It is to be understood that the wheeled axles may be of any conventional construction including the provision of conventional brake assemblies not shown adapted to be actuated from the control cabin of the vehicle.

The suspension assembly 10 includes pairs of front, intermediate and rear hangers, only one hanger of each pair being shown, generally indicated by numerals 22, 24 and 26, respectively. As shown, the hangers constitute three separate subassemblies, each of which is separately secured to the vehicle frame 12 although, it is to be understood that three hangers can be provided by a single rigid subassembly which is rigidly secured to the frame of the vehicle as a unit.

Each front hanger 22 comprises a pair of transversely-spaced L-shaped mounting plates 28 positioned beneath side frame members of the vehicle frame 12, and rigidly secured thereto by bolt assemblies 30, welding or other suitable fastener means. A metallic wear plate 32 extends between and is welded or otherwise rigidly secured in a fixed position to the upper portions of the depending members of each pair of hanger plates 28; while one end of a torsion bar assembly 34 is secured to the lower portions of the depending members. Spaced below the wear plate 32 on each hanger 22 is a tubular member 36 which extends between and is welded or otherwise rigidly secured to the pair of plates 28 thereby serving to brace the lower end portions of each pair of hanger plates. In addition to the bracing and bolt assemblies shown, additional cross-bracing of conventional construction can be provided if needed.

Each intermediate hanger 24, as shown in FIGURES 1 to 3, also includes a pair of transversely-spaced L-shaped mounting plates 38 similar to the mounting plates 28 previously described. Mounting plates 38 are positioned beneath and rigidly secured to the side frame members of vehicle frame 12 by bolt assemblies 40, welding or other suitable fastener means. Equalizer bracket 42 is pivotally mounted between the midportions of the depending members of the mounting plates 38 as will be more fully explained hereinafter; while torsion bar assembly 44 is secured to the lower portions of the depending members. In addition to the bracing and securing means shown, additional conventional bracing and cross-bracing of the intermediate hanger 24 can be provided if needed.

Each rear hanger 26 also includes a pair of transversely-spaced L-shaped mounting plates 48 similar to the mounting plates previously described. Mounting plates 48 are positioned and rigidly secured to the side frame members of the vehicle frame 12 by bolt assemblies 50, welding or other suitable fastener means. A metallic wear plate 52 extends between and is welded or otherwise rigidly secured in a fixed position to the upper portions of the depending members of each pair of hanger plates 48 while spaced below the wear plate 52 on each hanger 26, is a tubular member 56 which extends between and is welded or otherwise rigidly secured to the pairs of plates 48 thereby serving to brace the lower end portions of each hanger plate. In addition to the bracing and bolt assemblies shown, additional cross-bracing of conventional construction can be provided if needed.

The suspension assembly 10 of the present invention also includes a pair of of front leaf springs 60, only one of which is shown, mounted with their front ends in sliding abutting relation with the undersides of wear plates 32 and with their rear ends in sliding abutting relation with the undersides of wear plates 62 of equalizer brackets 42. The medial portion of each leaf spring 60 is rigidly secured to the forward transversely etxending tandem axle 14 by a shackle which comprises U-bolts 64, and U-bolt saddle block 66, a spring seating block 68 and a clamping plate 70 of conventional design. U-bolt saddle block 66 engages the upper surface of leaf spring 60 and is provided with grooves for retaining U-bolts 64 which pass over the saddle block and down through apertures in the spring seating block 68 which rests on the upper surface of axle 14. The U-bolts continue down through the clamping plate 70 which engages the lower surface of axle 14 and the entire assembly is locked in place by nuts 72 which engage the lower surface of clamping plate 70.

The spring seating block 68 has a pair of integral spaced-apart elements which form a bracket 74 extending toward the front end of the vehicle for mounting the rear end of front torque arm 34. As shown, torque arm 34 is preferably of conventional adjustable construction with its rear end pivotally connected to the bracket 74 as by a pivot bolt and bushing assembly 76 and its front end pivotally connected between the lower forward end portions of hanger plates 28 as by a pivotal bolt and bushing assembly 78.

The suspension assembly 10 of the present invention also includes a pair of rear leaf springs 80, only one of which is shown, mounted with their front ends in sliding abutting relation with the undersides of wear plates 82 of equalizer bracket 42 and with the rear end of the spring 80 in sliding abutting relation with the undersides of wear plate 52. The medial portion of each leaf spring 80 is rigidly secured to the rear, transversely extending tandem axle 14 by a shackle which comprises U-bolts 84, U-bolt saddle block 86, a spring seating block 88 and clamping plate 90 of conventional design. U-bolt saddle block 86 engages the upper surface of leaf spring 80 and is provided with grooves for retaining U-bolts 84 which pass over the saddle block and down through apertures in the spring seating block 88 which rests on the upper surface of axle 18. The U-bolts continue down through the clamping plate 90 which engages the lower surface of axle 18 and the entire assembly is locked in place by nuts 92 which engage the lower surface of clamping plate 90.

Clamping plate 90 has a pair of integral spaced-apart elements which form a bracket 94 extending toward the front end of the vehicle for mounting the rear end of rear torque arm 44. As shown, the torque arm 44 is preferably of conventional adjustable construction with its rear end pivotally connected to elements 94 as by a pivoted bolt and bushing assembly 96 and its front end pivotally connected between the lower end portion of hanger plates 38 as by a pivotal bolt and bushing assembly 98. The pivotal bolt and bushing assembly 98, as shown in FIGURE 3, comprises a bolt assembly 100 with a metallic sleeve 102 thereon having reinforcing plates joined to the ends thereof. Carried about the sleeves 102 is a resilient sleeve 106 of rubber or the like which carries the forward end of torque arm 44. While only pivotal bolt and bushing assembly 96 is shown in detail, it is to be understood that bolt and bushing assemblies 76, 78 and 96 are of similar construction.

As shown in FIGURE 3, each central hanger 24 includes opposed hanger plates 38 with a load equalizer bracket 42 mounted between them which receives the adjacent ends of leaf springs 60 and 80. The equalizer bracket 42 is resiliently mounted on an equalizer bearing 112 which includes a center sleeve 114 interposed between opposed end plates 116 having apertures therethrough for receiving bolt assemblies 118 that fixedly connect the bearing between recesses 119 in the plates 38. A resilient sleeve 120 of rubber or the like is mounted on the exterior surface of a cylindrical sleeve 114. The sleeve 120, in turn, is slidably received within sleeves 122 and 122' of equalizer bracket elements 124 and 124', respectively, whereby elements 124 and 124' of the equalizer bracket are pivotally secured intermediate their ends to the equalizer bearing 112 in snug engagement with the resilient sleeve 120 as best shown in FIGURE 3.

Elements 124 and 124' are identical in construction. Therefore, to avoid unnecessary repetition, it is to be understood that the following description of element 124 applies also to element 124', with like components being indicated in the drawings by unprimed and primed reference characters, respectively.

As best shown in FIGURE 4, in the preferred form of the invention, element 124 is substantially channel-shaped in transverse cross-section having a web 126 and flanges 128, 130. The element comprises a first arm 132 and a second arm 134 depending from the first arm at substantially a right angle. In addition, each arm comprises a terminal portion 136, 138, respectively, of a width substantially equal to, but less than the distance between the inner surfaces of mounting plates 38, an inner portion 140, 142, respectively, extending away from the juncture of the two arms and having a width substantially equal to, but less than one-half the distance between the inner surfaces of mounting plate 38, and an intermediate portion 144, 146, respectively, joining the inner and outer portions. In the illustrative embodiment, flange 128 of arms 132 and 134 extends in a vertical plane while flange 130 has terminal sections 148, 150 at the terminal portions of the arms which extend in a first vertical plane, inner sections 152, 154 at the inner portions of the arms which extend in a second vertical plane that is different from the first plane and diagonally extending intermediate sections 156, 158 at the intermediate portions of the arms which interconnect the inner and outer sections of the flange 130. Of course, it is to be understood that although the preferred form of the invention is shown and described, the configuration of elements 124, 124' can be altered as long as any modification continues to include the principles of the present invention.

Arm 132 is provided with a wear plate 62 for engaging the leaf spring, a tubular bracing member 160 and a mounting sleeve 122 for pivotally securing the element to resilient sleeve 120 of the bearing element 112. The wear plate 62 extends between the downwardly extending flanges 128, 130 and is welded or otherwise rigidly secured to the flanges at the terminal portion 136 of the arm. Tubular member 160 is spaced below wear plate 62, extends between flanges 128, 130 and is welded or otherwise suitably secured to flanges 128, 130. The sleeve 122 extends through flanges 128 and 130 at the inner portion 140 of the arm and is welded or otherwise rigidly secured to the flanges in such a manner that the longitudinal axis of the sleeve extends in a substantially horizontal direction when the sleeve is mounted on the resilient sleeve 120 of the equalizer bearing 112. The sleeve 122 is positioned midway between the inner end of arm 132 and intermediate portion 144 or closer to the inner end of the arm than intermediate portion 144 so that the elements 124, 124' will not interfere with each other when mounted on equalizer bearing 112.

Arm 134 is provided with a cylindrical boss 162 which is welded or otherwise rigidly secured to the web 126 of the arm at the terminal portion 138 of the arm. The boss extends away from the web 126 in the same direction as the flanges 128, 130 of the arm and is provided to locate and retain a coil spring 164 or other dampening means which extend between the arms 134, 134' of the two elements 124, 124' of the bracket 42.

While in the preferred form of the invention, a coil spring 164 is utilized as the dampening means, it is to be understood that air bellows, air bags or other suitable dampening elements can be interposed between depending arms 134, 134' if desired. These other dampening elements, if used, can be suitably mounted on the depending arms 134, 134' in any conventional manner.

As best shown in FIGURES 1 to 3, elements 124, 124' are pivotally mounted on resilient sleeve 120 of equalizer bearing 112 with the inner portions 140, 140' adjacent each other and with terminal portions 136, 136' extending outwardly from the pivotal mounting in opposite directions. Since the inner portions are substantially equal to, but less than one-half the distance between the inner surfaces of mounting plates 38, and the outer portions are substantially equal to, but less than the distance between inner surfaces of mounting plates 38, relative pivotal movement of the elements 124, 124' with respect to each other and the mounting plates 38 is assured. In addition, the configuration of the elements 124, 124' and the manner in which the elements are mounted on equalizer bearing 112 assures that the center lines of the enlarged terminal portions 136, 136', 138, 138' and leaf springs 60, 80 will extend in a common plane. With the bosses 162, 162' mounted on the enlarged terminal portions 138, 138' of arms 134, 134', the longitudinal center line of coil spring 164 is also aligned with the longitudinal center lines of leaf springs 60 and 80 so that the forces transmitted through the coil spring 164 from one equalizer element to the other element will not tend to exert a torque on the elements about a vetrical axis passing through the equalizer bracket. This, of course, ensures that the elements will not become cocked relative to one another during operation of the equalizer bracket.

OPERATION

In operation, the flexing of one or both of the leaf spring assemblies 60 and 80 causes pivotal movement of one equalizer element relative to the other equalizer element about equalizer bearing 112. The forces causing the relative movements of the equalizer elements 124, 124' are transmitted through the coil spring 164 from one element to the other and, therefore, from one leaf spring assembly to the other leaf spring assembly whereby the loading on axles 14 and 18 is automatically shifted in accordance with the requirements of different situations. By having the force transmitted through a coil spring 164 or other dampening means rather than a rigid member as is the usual case, the hard ride of the vehicle is cushioned or dampened with a resulting improvement in the ride imparted to the vehicle by the suspension system.

While the preferred form of the invention has been shown and described, it is to be understood that all suitable modifications and equivalents may be resorted to which fall within the scope of the invention as claimed.

What is claimed is:

1. An equalizer bracket for a tandem axle assembly comprising:
   first equalizer element means for engaging suspension means associated with a first axle of a tandem axle vehicle, said first equalizer element means being pivotally mounted on a bearing means, and said first equalizer element means comprising a first arm and a second arm, said first arm of said first equalizer element means for engaging said suspension means associated with said first axle, and second arm of said first equalizer element means depending from said first arm of said first equalizer element means;
   second equalizer element means for engaging suspension means associated with a second axle of said tandem axle vehicle, said second equalizer element means being pivotally mounted on said bearing means, and said second equalizer element means comprising a first arm and a second arm, said first arm of said second equalizer element means for engaging said suspension means associated with said second axle, and said second arm of said second equalizer element means depending from said first arm of said second equalizer element means;
   said first equalizer element means and said second equalizer element means being capable of pivotal movement relative to each other; and
   dampening means associated with said first and second equalizer element means for transmitting forces between said equalizer element means and for dampening relative movement of said equalizer element means with respect to each other, said dampening means extending between and being carried by said second arms of said first and second equalizer element means.

2. In the equalizer bracket of claim 1:
   said second arm of said first equalizer element means depending from one end of said first arm of said first equalizer element means at a substantially right angle with respect to said first arm of said first equalizer element means; and
   said second arm of said second equalizer element means depending from one end of said first arm of said second equalizer element means at a substantially right angle with respect to said first arm of said second equalizer element means.

3. In the equalizer bracket of claim 1:
   said first arms of said first and second equalizer element means each carrying a sleeve, each of said sleeves being pivotally mounted on said bearing means.

4. In the equalizer bracket of claim 1:
   said dampening means being a coil spring, said coil spring being retained on bosses of said second arms of said first and second equalizer element means.

5. In the equalizer bracket of claim 1:
   said first arms of said first and second equalizer element means each having an enlarged terminal portion for engaging suspension means;
   said second arms of said first and second equalizer element means each having an enlarged terminal portion for carrying said dampening means; and
   the center lines of said enlarged terminal portions being located in a common plane to enable the proper transmission of forces through the equalizer bracket.

6. In the equalizer bracket of claim 5:
   said first and second arms of said first and second equalizer element means having narrow portions approximately half the width of said enlarged terminal portions and adjacent the respective junctures of said first and second arms of said equalizer element means, one of said narrow portions of each of said equalizer element means carrying mounting means pivotally mounted on said bearing means.

7. In the equalizer bracket of claim 6:
   said mounting means being carried by said narrow portions of said first arms of said equalizer element means, said narrow portions of said first arms being adjacent each other, and said enlarged terminal portions of said first arms extending outwardly with respect to the pivotal mounting in opposite directions.

8. A tandem axle assembly for suspending a vehicle frame comprising:
   a front axle, said front axle having leaf spring means mounted thereon;
   a rear axle, said rear axle having leaf spring means mounted thereon;
   front hanger means depending from said vehicle frame, said leaf spring means of said front axle being operatively associated with said front hanger means;
   rear hanger means depending from said vehicle frame, said leaf spring means of said rear axle operatively associated with said rear hanger means;

hanger means depending from said vehicle frame intermediate said front axle and said rear axle, said hanger means having equalizer bracket means mounted thereon; and said equalizer bracket means comprising first equalizer element means engaging said spring leaf means of said front axle, said first equalizer element means being pivotally mounted on bearing means, and said bearing means being carried by said intermediate hanger means; second equalizer element means engaging said leaf spring means of said rear axle, said second equalizer element means being pivotally mounted on said bearing means; said first equalizer element means and said second equalizer element means being capable of pivotal movement relative to each other; and dampening means associated with said first and second equalizer element means for transmitting forces between said equalizer element means and for dampening relative movement of said equalizer element means with respect to each other whereby the loading on said axles can be automatically transferred from one axle to the other axle and the ride imparted to said vehicle is cushioned.

References Cited
UNITED STATES PATENTS

| | | | |
|---|---|---|---|
| 3,171,668 | 3/1965 | Willetts | 280—104.5 |
| 2,869,889 | 1/1959 | Dickison | 280—104.5 |
| 1,893,695 | 1/1933 | Chenoweth | 280—104.5 |

PHILIP GOODMAN, Primary Examiner

U.S. Cl. X.R.

280—124